United States Patent Office 3,264,368
Patented August 2, 1966

3,264,368
AZIRIDINYLFORMATE BASED POLYURETHANES
Robert E. Lane, Jr., and George E. Ham, Lake Jackson, Tex., assignors to The Dow Chemical Company, Midland, Mich., a corporation of Delaware
No Drawing. Filed Aug. 6, 1964, Ser. No. 387,992
12 Claims. (Cl. 260—77.5)

This invention relates to a new type of thermoplastic urethane polymer consisting essentially of mer units having the formula $$-CRR-CRR-N- \\ \phantom{-CRR-CRR-}\overset{|}{COOR'}$$

wherein each R is H or an inert organic radical and R' is the radical formed by removal of the alcoholic OH group from an alcohol, each R and R' being free of substituents reactive with aziridine under the conditions under which the polyurethane is made.

The new polyurethanes can be made in several different ways. According to one method, the corresponding polyethyleneimine, the mer unit of which has the formula $$-CRR-CRR-NH-$$

is reacted with a haloformate having the formula $$R'OCOX$$

wherein X is a halogen, preferably chlorine or bromine. This reaction is preferably conducted in the presence of a stoichiometric amount of an acid acceptor, for instance, a tertiary amine or an alkali.

A preferred method for making the new polymers is the polymerization of the corresponding aziridinylformate:

$$\begin{array}{c}CRR-CRR\\ \diagdown N\diagup \\ |\\ COOR'\end{array} \longrightarrow -CRR-CRR-N-\\ \phantom{xxxxxxxxxxxxxxxxxxxxxx}\overset{|}{COOR'}$$

This polymerization is easily effected and is catalyzed by Lewis acids or strong bases.

The preferred polymers are those in which at least 3 of the R groups in the above formulas are H. R, when not H, and R' are inert organic radicals, preferably alkyl, aralkyl or cycloalkyl radicals and preferably containing no more than 8 carbon atoms each. While it is preferred that such organic radicals be hydrocarbon, they may contain inert substituents, such as halogen, or ether oxygen. Thus, one or more R groups may be an alkyl radical, preferably a lower alkyl radical, i.e., one containing 1-8 carbon atoms, such as methyl, ethyl, isopropyl, sec-butyl, n-amyl, 2-ethylbutyl, n-octyl, 3-ethyl-3-hexyl and 4-octyl; a haloalkyl radical, such as the above alkyl radicals but having one or more halogen substituents; an alkoxyalkyl radical, such as 2-methoxyethyl, 2-ethoxypropyl, 2-butoxybutyl, 3-methoxy-2-butyl, 2-methoxyethoxyethyl, and the like; an aralkyl radical, such as benzyl, o-, m-, and p-methylbenzyl, and 1- and 2-phenylethyl radicals and the like, including the halogen-substituted derivatives thereof; or a cycloalkyl radical, especially those containing the cyclohexyl ring, such as cyclohexyl, methylcyclohexyl, dimethylcyclohexyl and the halogen-substituted derivatives thereof. Each R radical in the above formula is independently selected and thus may be different from the others. Moreover, in a given polymer obtained by copolymerizing a mixture of monomers, the R radicals may vary from one mer to the next, either in a random fashion (heteric, or random, copolymer) or in an orderly fashion (block or graft copolymer).

The R' radical in the above formulas is an organic radical that can be any of those set forth above for R. Among the preferred species are the alkyl, alkoxyalkyl and alkoxypolyoxyalkylene radicals. The last named are those having the formula.

$$\text{Alkyl—(O-alkylene)}_n\text{—}$$

wherein $n$ represents an integer from 1–10, the alkyl portion contains 1–8 carbons and the alkylene radicals each contain 2–4 carbons, specific examples of which include $C_2H_5\text{—}(OC_2H_4)_4\text{—}$, $C_4H_9\text{—}(OC_3H_6)_2\text{—}$, $$CH_3\text{\textendash}[OCH_2CH\text{—}(C_2H_5)]_3$$

and $n\text{—}C_8H_{17}\text{—}(OCH_2CH_2)_{10}\text{—}$.

Many of the aziridinylformate esters that can be polymerized to produce the polymers of the invention are known and others can be made by analogous processes using the appropriate aziridine and chloroformate ester. This is essentially the method commonly used to make the aziridinylformates of glycols and other polyols and is equally adaptable to the esterification of monohydric alcohols.

The monomeric aziridinylformate esters are readily polymerized by the techniques known for polymerization of the aziridinylformates of polyols. They can be homopolymerized or they can be copolymerized by subjecting mixtures of two or more of the monomers to polymerizing conditions. Polymerization can be effected with or without an inert solvent and is conveniently catalyzed by either acid or base catalysts. Among the effective catalysts are the Lewis acids, such as HCl, $H_2SO_4$, sulfonic acids, aluminum halides, boron fluoride, zinc halides, etc. and the strong bases, such as alkali metal alcoholates and alkali metal hydrocarbons.

The practice of the invention is illustrated by the following examples.

Example 1

Ethyl 1-aziridinylformate (EAF) (0.2 g. mol.) was dissolved in 241 ml. of xylene and cooled to 0° C. under a nitrogen atmosphere. Then 0.8 ml. of freshly distilled $BF_3$ etherate was added with stirring. After 15 minutes 0.03 ml. of water was added and the flask was then allowed to warm to room temperature. After the mixture had stood for 3 days at 25° C. the solvent was evaporated at up to 70° C. at 0.05 mm. pressure. The residue (quantitative yield) was a soft, tacky solid, soluble in acetone. Infrared analysis confirmed the basic structural unit $$-CH_2CH_2N-\\ \phantom{-CH_2CH_2}\overset{|}{COOC_2H_5}$$

Example 2

EAF (0.227 g. mol.) in 245 ml. of ethylene chloride was polymerized essentially as described in Example 1 by the addition of 0.54 ml. of $BF_3$ etherate. At 26° C. the conversion was 50% but on heating to 80° C. the conversion was complete. The product was an exceedingly viscous, tacky semisolid which was an excellent pressure-sensitive adhesive.

Example 3

EAF (0.227 g. mol.) in 190 ml. of nitromethane was cooled to −14° C. under $N_2$ and 0.54 ml. of $BF_3$ etherate was added. The temperature quickly rose to −6°, then returned to −14°. The mixture was held 1.5 hr. at −14°, then 3 days at 25°. Removal of the solvent under vacuum left a quantitative yield of honey-colored, tacky, semisolid polymer having an intrinsic viscosity of 0.050 in methyl ethyl ketone at 25°. After 4 months the product was noted to have solidified to a thermoplastic resin having intrinsic viscosity of 0.057. Upon being boiled in 1 N HCl it was converted to a white solid, insoluble in acetone and melting above 275° C.

Example 4

EAF (0.227 g. mol.) was polymerized in 138 g. of nitromethane at 50° C. for 65 hr., the procedure otherwise being essentially as in the preceding examples. A quantitative yield of clear, light yellow, tacky semisolid was obtained. On standing several days it gradually changed to an off-white, opaque solid gum melting at 80° C. and having an intrinsic viscosity of 0.042 in methyl ethyl ketone at 35° C.

Example 5

EAF (1 ml.) was placed in a test tube and 1 drop of $BF_3$ etherate was added. A vigorous exothermic reaction ensued, producing a viscous, liquid polymer.

Example 6

The experiment of Example 5 was repeated except that 1 drop of a 40% aqueous solution of $Zn(BF_4)_2$ was used as catalyst. The reaction and product were similar to those of Example 5.

Example 7

The monoethyl ether of diethylene glycol was reacted with phosgene to produce the chloroformate and the latter was reacted with aziridine to produce ethoxyethoxyethyl aziridinylformate. Ten ml. of the latter were mixed with 0.2 ml. of $BF_3$ etherate, whereupon a vigorous exothermic reaction ensued. The product was a very viscous, sticky liquid having a refractive index of 1.4690 and a Brookfield viscosity of 500 cps. It was soluble in water, ethanol, acetone and xylene but insoluble in aliphatic hydrocarbons. It consisted essentially of the repeating unit

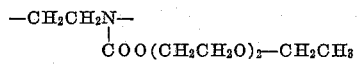

Hydrolysis by boiling with aqueous acid produced $CO_2$, diethylene glycol monoethyl ether and polyethylenimine.

The solid and semisolid polymers of this invention are useful as adhesives, particularly for the lamination of glass and the like. Both the solid and the liquid polymers are useful as chemical intermediates. Hydrolysis yields polyethylenimines of the same chain length as the parent polymer. They are reactive with isocyanates, particularly organic polyisocyanates such as are used to prepare commercial polyurethanes. This latter reactivity provides a means for increasing the polymer chain length, or even cross-linking and curing the resins to insoluble, infusible solid resins.

We claim:

1. A polyurethane consisting essentially of units having the formula

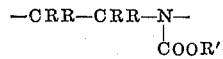

wherein each R is independently selected from the group consisting of H and alkyl, aralkyl and cycloalkyl radicals containing up to 8 carbon atoms and R' is a monovalent organic radical selected from the group consisting of alkyl, aralkyl and cycloalkyl radicals containing up to 8 carbon atoms and alkyl—(O-alkylene)$_n$—radicals wherein the alkyl portion contains up to 8 carbon atoms, each alkylene group contains 2 to 4 carbon atoms and n is an integer from 1 to 10.

2. A polyurethane as defined in claim 1 wherein at least 3 of the R groups are H.

3. A polyurethane as defined in claim 2 wherein R' is alkyl.

4. A polyurethane as defined in claim 2 wherein R' is alkyl—(O-alkylene)$_n$— wherein the alkyl portion contains not more than 8 carbon atoms, each akylene group contains 2–4 carbon atoms and n is an integer from 1 to 10.

5. A polyurethane consisting essentially of repeating units having the formula

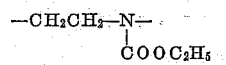

6. A polyurethane consisting essentially of repeating units having the formula

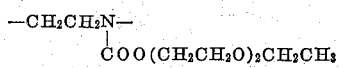

7. The method of making a polyurethane consisting essentially of units having the formula

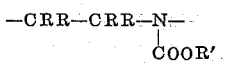

comprising polymerizing a monomer having the formula

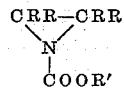

where in the above formulas each R is independently selected from the group consisting of H and an organic radical free of substituents reactive in the process and R' is the radical formed by the removal of an alcoholic hydroxyl group from an alcohol and is free of substituents reactive in the process by mixing a Lewis acid catalyst with said monomer.

8. The process defined in claim 7 wherein at least 3 of the R groups are H.

9. The process defined in claim 8 wherein R' and any R not H are alkyl radicals having 1–8 carbon atoms.

10. The process defined in claim 8 wherein each R is H and R' is a radical having the formula alkyl—(O-alkylene)$_n$— wherein the alkyl radical contains 1–8 carbon atoms, each alkylene radical contains 2–4 carbon atoms and n is an integer from 0 to 10, inclusive.

11. The process defined in claim 7 wherein the monomer has the formula

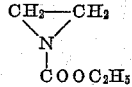

12. The process defined in claim 7 wherein the monomer has the formula

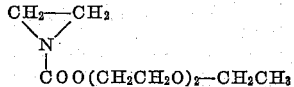

References Cited by the Examiner

UNITED STATES PATENTS

| | | | |
|---|---|---|---|
| 2,626,931 | 1/1953 | Bestian | 260—2 |
| 3,119,790 | 1/1964 | Tsou | 260—2 |
| 3,162,618 | 12/1964 | Smith | 260—2 |

LEON J. BERCOVITZ, *Primary Examiner.*

M. C. JACOBS, *Assistant Examiner.*